US012809062B2

(12) United States Patent
Kalyankar et al.

(10) Patent No.: US 12,809,062 B2
(45) Date of Patent: Nov. 24, 2026

(54) ELECTRONIC DEVICES WITH LENSES

(71) Applicant: Apple Inc., Cupertino, CA (US)

(72) Inventors: Nikhil D. Kalyankar, Fremont, CA (US); Avery P. Yuen, Campbell, CA (US); Elson Y. Liu, Santa Clara, CA (US); James R. Wilson, Saratoga, CA (US); Ove Lyngnes, Carmel Valley, CA (US); Peter J. Guest, San Jose, CA (US); Keenan Molner, San Francisco, CA (US); Ryan Springer, San Francisco, CA (US); William W. Sprague, San Francisco, CA (US); Brandon E. Clarke, San Jose, CA (US); Wei-Liang Hsu, San Jose, CA (US); Mehmet Mutlu, Grover Beach, CA (US); Victoria C. Chan, Sunnyvale, CA (US)

( * ) Notice: Subject to any disclaimer, the term of this patent is extended or adjusted under 35 U.S.C. 154(b) by 527 days.

(21) Appl. No.: 18/324,078

(22) Filed: May 25, 2023

(65) Prior Publication Data

US 2023/0358920 A1 Nov. 9, 2023

Related U.S. Application Data

(63) Continuation of application No. PCT/US2021/057732, filed on Nov. 2, 2021.

(Continued)

(51) Int. Cl.

*G02B 1/118* (2015.01)
*G02B 1/14* (2015.01)

(Continued)

(52) U.S. Cl.

CPC ................ *G02B 1/118* (2013.01); *G02B 1/14* (2015.01); *G02B 1/16* (2015.01); *G02B 1/18* (2015.01); *G06F 3/013* (2013.01); *H04N 23/10* (2023.01)

(58) Field of Classification Search

CPC . G02B 1/118; G02B 1/14; G02B 1/16; G02B 1/18; G06F 3/01

See application file for complete search history.

(56) References Cited

U.S. PATENT DOCUMENTS

| | | | |
|---|---|---|---|
| 9,069,115 | B2 | 6/2015 | Gupta et al. |
| 10,078,224 | B2 | 9/2018 | Border et al. |

(Continued)

FOREIGN PATENT DOCUMENTS

| | | | |
|---|---|---|---|
| CN | 102124394 | A | 7/2011 |
| CN | 105765422 | A | 7/2016 |

(Continued)

OTHER PUBLICATIONS

WO 2020045415 A1 (Shinoki, Keiichiro) machine translation (Year: 2020).*

*Primary Examiner* — James A Dudek

(74) *Attorney, Agent, or Firm* — Treyz Law Group, P.C.; Tianyi He

(57) ABSTRACT

A head-mounted device may have optical modules that present images to a user's left and right eyes. Each optical module may have a lens support structure that supports a display and a fixed lens. Vision correction lenses may be removably coupled to the fixed lenses to help customize the head-mounted device to the vision of a particular user. A user may view images on the displays through the removable and fixed lenses from eye boxes. The optical modules may include infrared light sources that supply infrared light to the eye boxes and infrared light sensors such as infrared cameras for gaze tracking and authentication. The lenses (Continued)

may have optical surfaces covered with coating that enhance optical performance and may have edge surfaces that are provided with structures to help reduce stray light reflections. The lenses may be configured to pass visible and infrared light.

32 Claims, 5 Drawing Sheets

Related U.S. Application Data

(60) Provisional application No. 63/120,648, filed on Dec. 2, 2020.

(51) Int. Cl.

| | |
|---|---|
| ***G02B 1/16*** | (2015.01) |
| ***G02B 1/18*** | (2015.01) |
| *G06F 3/01* | (2006.01) |
| *H04N 23/10* | (2023.01) |

(56) References Cited

U.S. PATENT DOCUMENTS

| | | | | |
|---|---|---|---|---|
| 10,509,153 | B2 | 12/2019 | Urness et al. | |
| 11,614,638 | B1 * | 3/2023 | Sharma .................. | G02C 7/022 351/159.75 |
| 2017/0248792 | A1 | 8/2017 | Border | |
| 2018/0249151 | A1 | 8/2018 | Freeman et al. | |
| 2019/0113968 | A1 | 4/2019 | Huang et al. | |
| 2020/0159026 | A1 | 5/2020 | Waldern et al. | |
| 2020/0218089 | A1 | 7/2020 | Dubail et al. | |
| 2020/0234504 | A1 | 7/2020 | Haddick et al. | |

FOREIGN PATENT DOCUMENTS

| | | | |
|---|---|---|---|
| CN | 110603476 | A | 12/2019 |
| CN | 209821509 | U | 12/2019 |
| CN | 209842236 | U | 12/2019 |
| EP | 3232237 | A1 | 10/2017 |
| EP | 3499341 | A1 | 6/2019 |
| WO | 02014930 | A1 | 2/2002 |
| WO | 2016138969 | A1 | 9/2016 |
| WO | 2020247267 | A1 | 12/2020 |

* cited by examiner

ELECTRONIC DEVICES WITH LENSES

This application is a continuation of international patent application No. PCT/US2021/057732, filed Nov. 2, 2021, which claims priority to U.S. provisional patent application No. 63/120,648, filed Dec. 2, 2020, which are hereby incorporated by reference herein in their entireties.

FIELD

This relates generally to electronic devices, and, more particularly, to electronic devices with displays and lenses.

BACKGROUND

Electronic devices such as head-mounted devices may have displays for displaying images. The displays may be housed in optical modules. Lenses may be mounted in the optical modules. Using the lenses, a user may view displayed images.

SUMMARY

A head-mounted device may have optical modules or other support structures with displays that present images to a user's left and right eyes. Each optical module may have a lens support structure that supports a respective display and fixed lens. Vision correction lenses may be removably coupled to the fixed lenses to accommodate a user's vision.

During operation, a user may view images on the displays through the vision correction lenses and the fixed lenses from eye boxes. The optical modules may include infrared light sources that supply infrared light to the eye boxes and infrared light sensors such as infrared cameras. The infrared components may be used for gaze tracking and authentication.

The lenses of the head-mounted device may have optical surfaces covered with coatings that enhance optical performance such as antireflection coatings and other coating layers. The lenses may also have edge surfaces with structures that help reduce stray light reflections. The lenses may be configured to pass visible light associated with the displays and to pass infrared light associated with the infrared light sources and infrared cameras.

DETAILED DESCRIPTION

An electronic device such as a head-mounted device may have a head-mounted support structure that supports lenses, displays and other components. During operation, the head-mounted device may display visual content for a user such as virtual reality content or augmented reality content.

The head-mounted support structure may be configure to form a pair of glasses, a pair of goggles, a helmet, or other head-mounted device. Illustrative configurations in which the head-mounted device is a pair of goggles may sometimes be described herein as an example.

The head-mounted support structure may have a front face that faces away from a user's head and may have an opposing rear face that faces the user's head. Optical modules on the rear face may be used to provide images to a user's eyes. Each optical module may have a lens barrel in which a fixed lens is mounted. Optional removable supplemental lenses may be coupled to the optical modules. The supplemental lenses, which may sometimes be referred to as vision correction lenses may be used to correct for a user's vision defects such as near-sightedness, far-sightedness, and astigmatism.

To ensure satisfactory operation of the head-mounted device, the vision correction lenses (and, if desired, the fixed lenses) may be provided with coatings and other structures that help reduce stray light and provide the lenses with a desired mechanical robustness while ensuring that the lenses exhibit desired amounts of light transmission over all operating wavelengths.

Figure 1:
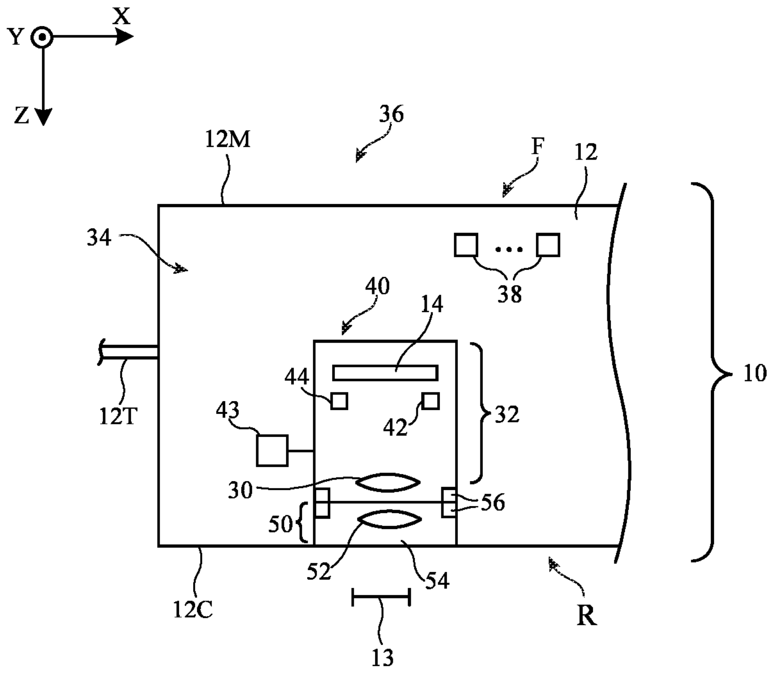
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., support structure 12T) to allow device 10 to be worn on a user's head. Support structure 12T may be formed from fabric, polymer, metal, and/or other material. Support structure 12T may form a strap or other head-mounted support structure to help support device 10 on a user's head. A main support structure (e.g., main housing portion 12M) of housing 12 may support electronic components such as display 14. There may be left and right displays 14 in device 10. In the example of FIG. 1, a left display for a user's left eye is shown as an example.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, glass, metal, fabric, leather, or other materials. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, control circuitry, and/or other circuits and structures for device 10. These components may include sensors such as image sensors, ambient light sensors, touch sensors, force sensors, orientation sensors (e.g., orientation sensors based on accelerometers, compasses, and/or gyroscopes such as orientation sensors based on inertial measurement units containing some or all of these components), proximity sensors, capacitive sensors, optical sensors, three-dimensional image sensors such as structured light sensors and/or three-dimensional sensors based on stereoscopic pairs of two-dimensional image sensors, gaze tracking sensors, hand sensors, sensors for monitoring the movement and position of accessories such as controllers, microphones for gathering voice commands and measuring ambient noise, temperature sensors, fingerprint sensors and other biometric sensors, and/or other sensing circuitry.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have left and right optical modules 40. A left optical module and associated left eye box 13 are shown in the left portion of device 10 of FIG. 1. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14 mounted in a respective support structure 32. Support structures 32, which may sometimes be referred to as lens barrels, lens support structures, optical component support structures, or optical module support structures, may include hollow cylindrical structures with open ends or other supporting structures to house displays 14 and lens components. Support structures 32 may, for example, include a left lens barrel that supports a left display 14 and left lens 30 and a right lens barrel that supports a right display 14 and right lens 30.

Lenses 30 may be fixedly mounted to support structures 32. Additional vision correction lens modules 54 may be fixedly or removably coupled to modules 40 (e.g., to form a left lens that is corrected for the user's left eye vision and a right lens that is corrected for the user's right eye vision).

Vision correction lens modules 54 may each have one or more vision correction lens elements (sometimes referred to as vision correction lenses or lens substrates) mounted in a vision correction lens housing such as housing 50. As shown in FIG. 1, vision correction lenses (lens elements) 52 of lens modules 54 may overlap corresponding fixed lenses 30. During operation, a user may view an image on each display 14 through a respective vision correction lens 52 and a respective overlapped fixed lens 30. Vision correction lenses 52 may be selected to correct for the vision defects (e.g., nearsightedness, farsightedness, and/or astigmatism) of a user.

Each housing 50, which may sometimes be referred to as a lens mount or vision correction lens support structure may be formed from a ring of polymer, metal, and/or other materials. An opening in the center of housing 50 may accommodate lens element 54. One or more magnets 56 or other attachment structures (e.g., press-fit connections, fasteners, etc.) may be mounted in housing 50 and may be mounted in corresponding portions of support structure 32 of module 40 to allow vision correction lens 52 to be removably attached to module 40. This type of arrangement may allow different users to install different vision correction lenses.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30, which may sometimes be referred to as fixed lenses, may include one or more lens elements and may be used in conjunction with respective overlapping vision correction lenses 52 to provide image light from displays 14 to respective eyes boxes 13. Lenses for device 10 (e.g., lenses 30) may be implemented using refractive lens elements, using mirror lens structures (catadioptric lenses), using Fresnel lenses, using holographic lenses, and/or other lens systems. Removable lenses 52 may likewise be formed from such lens elements (e.g., refractive lens elements).

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light sources 44 (e.g., light-emitting diodes, lasers, etc.).

Cameras 42 and light sources 44 may operate at any suitable wavelengths (visible, infrared, and/or ultraviolet). With an illustrative configuration, which may sometimes be described herein as an example, light sources 44 emit infrared light that is invisible (or nearly invisible) to the user. The emitted light may, as an example, be near infrared light at a wavelength of 740 nm to 1000 nm, 940 nm, 850 nm to 1000 nm, or other suitable near infrared wavelength. This allows eye monitoring operations to be performed continuously without interfering with the user's ability to view images on displays 14. Light sources 44 may, for example, include multiple light-emitting diodes or lasers arranged in a ring around the periphery of support structure 32. During operation, emitted infrared light from light sources 44 may pass through lenses 30 and 52 to illuminate the user's eyes (e.g., as flood illumination and/or glints) and cameras 42 may capture infrared images of the user's illuminated eyes through lenses 30 and 52.

Not all users have the same interpupillary distance. To provide device 10 with the ability to adjust the interpupillary spacing between modules 40 along lateral dimension X and thereby adjust the spacing between left and right eye boxes 13 to accommodate different user interpupillary distances, device 10 may be provided with actuators 43 (e.g., left and right actuators or a common actuator that adjusts the position of both left and right optical modules). Actuators 43 can be manually controlled and/or actuators 43 may be computer-controlled actuators (e.g., computer-controlled motors) that are used to move support structures 32 relative to each other. Information on the locations of the user's eyes may be gathered using, for example, cameras 42. The locations of eye boxes 13 can then be adjusted accordingly.

Device 10 of FIG. 1 may be operated as a stand-alone device and/or the resources of device 10 may be used to communicate with external electronic equipment. As an example, communications circuitry in device 10 may be used to receive user input information from an external controller and may be used to receive video and/or audio content from external equipment.

Vision-correction lenses 52 (and, if desired, fixed lenses 30) may have coatings and/or other surface treatments that help reduce stray light reflections and enhance light transmission. Coatings for lenses 52 may include one or more deposited layers of material that provide the lenses with desired mechanical and optical properties.

Figure 2:
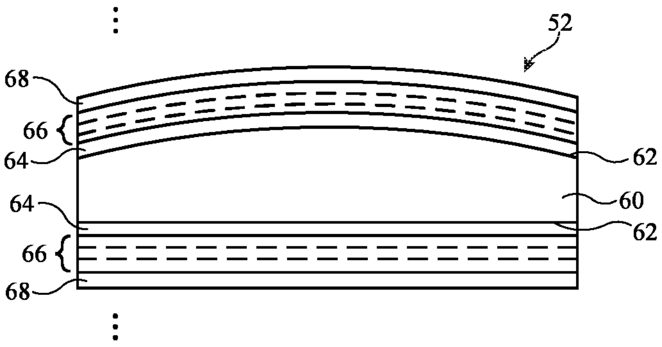
FIG. 2 is a cross-sectional side view of an illustrative lens in accordance with an embodiment.

A cross-sectional side view of an illustrative vision correction lens with optional coating layers is shown in FIG. 2. As shown in FIG. 2, vision-correction lens 52 may have a lens substrate such as lens substrate 60 formed from clear lens material. Substrates 60 may, for example, be formed from glass, polymer, sapphire or other crystalline material, and/or other lens material that is transparent at wavelengths of interest (e.g., visible light wavelengths and infrared wavelengths). Glass and crystalline materials such as sapphire may exhibit elevated wear resistance and satisfactorily high refractive index values, but clear polymer may be used, if desired. Substrates 60 may have opposing front and rear lens substrate surfaces 62 (sometimes referred to as optical surfaces). These surfaces may be planar and/or may have curved cross-sectional profiles (e., each surface 62 may be spherical or aspherical or may be planar).

One or more lens coatings such as illustrative coating layers 64, 66, and 68 of FIG. 2 and/or other coatings may be formed on one or both of surfaces 62.

Lens coatings for lens 52 may include, for example, anti-scratch layers (sometimes referred to as hard coats), anti-smudge layers, anti-fog layers, antireflection layers, anti-static layers, adhesion layers, anti-viral and/or anti-bacterial layers, and/or other coatings. In some configurations, each of these functions may be implemented using a separate respective coating layer. In other configurations, a single layer may serve multiple functions. For example, a layer of material may serve as both an anti-viral layer and as an anti-bacterial layer. As another example, an antireflection coating may include an antistatic layer. Coatings may be formed on the inwardly facing surface of lens 52 and/or on the outer surface of lens 52 (e.g., the surface of lens 52 that faces eye boxes 13 at the rear of device 10). Illustrative configurations in which coatings are provided symmetrically to both the inner and outer surfaces of lens 52 may sometimes be described herein as an example.

Coatings may be provided in any suitable order. As one example, coating 64 may be a hard coat that helps prevent scratches that could damage lens 54, layer 66 may be an antireflection coating (e.g., an antireflection coating containing a stack of sublayers), and layer 68 may be an anti-smudge coating or anti-fog coating. Antistatic layers, anti-viral layers, and anti-bacterial layers may be incorporated into one or more of the coatings of FIG. 2, may be interposed between the coating layers shown in FIG. 2, and/or may be formed above and/or below the coatings of FIG. 2.

Substrate 60 may be formed from polymer, glass, crystalline material such as sapphire, and/or other materials. In an illustrative configuration, lens 52 operates at visible light wavelengths (e.g., wavelengths from 380-740 nm) and near-infrared wavelengths (e.g., wavelengths from 740 nm to 800 nm, 740-900 nm, 740-1000 nm, 740-1200 nm, infrared light wavelengths less than 1100 nm, less than 1000 nm, or other suitable infrared wavelengths associated with operation of light sources 44 and camera 42 range). This allows a user to view visible light images produced by displays 14 and allows infrared optical components such as gaze tracking systems, iris scanning systems, and/or other infrared components based on light sources 44 and cameras 42 to operate satisfactorily using light that is invisible to the eye of the user. Polymer, glass, and/or sapphire or other crystalline materials that are transparent at these visible and infrared wavelengths may be used in forming substrate 60. Materials such as glass and sapphire or other crystalline materials may have refractive index values that are larger than for polymers, which may make the use of these materials satisfactory in scenarios in which the ability to reduce lens size is desired. For example, sapphire may have a refractive index of 1.75 at visible light wavelengths. Glass may have a refractive index value of 1.5-1.65. Some polymers may have refractive index values of 1.5-1.6. Materials such as glass and sapphire may provide enhanced durability. The use of polymer in lenses 52 may help reduce weight. High-index polymers (e.g., cyclic olefin copolymer or polycarbonate) and/or polymer with embedded nanostructures (e.g., inorganic particles having particles of subwavelength diameter) may be used, if desired.

A hard coat on lenses 54 may help enhance durability. The hard coat may have a thickness of 5 nm to 5 microns, less than 2 microns, less than 1 micron, or other suitable thickness. A wet hard coat, a hard coat based on a durable inorganic dielectric such as silicon oxide, a hard coat of diamond-like carbon, or other hard coat may be used (as examples). In an illustrative configuration, a hard coat may be formed from a material such as aluminum oxynitride.

The refractive index of the hard coat may be matched (e.g., within +/−0.1, within +/−0.05, or other suitable refractive index difference) to the refractive index of substrate 60 to help avoid undesired reflections at the interface between substrate 60 and the hard coat. If desired, hard coats may be applied by a physical vapor deposition process such as evaporation or sputtering. The use of sputter deposited hard coats may help enhance scratch resistance. In some configurations, hard coat layers may serve as one of the thin-film layers in a thin-film interference filter configured to form an antireflection coating (e.g., antireflection coating layer 66 of FIG. 2). If desired, hard coats can be applied by depositing and curing a liquid polymer (with or without embedded particles). Curing may be accomplished by applying ultraviolet curing light and/or using thermal curing techniques (as examples). An optional primer (e.g., a hard coat adhesion layer) may be applied under a hard coat layer to enhance adhesion.

Antireflection coatings for lenses 54 may be formed from moth-eye structures, single-layer coatings, graded-index coatings, or coatings formed from thin-film interference filters. A single layer antireflection coating may have a refractive index value that lies between that of the lens substrate and surrounding air or other suitable refractive index value to help reduce reflections. A graded-index coating may have a composition that changes smoothly so as to produce a corresponding smoothly varying value of refractive index from one side of the coating to the other (e.g., a value that monotonically varies between a first composition that is entirely or mostly composed of a higher index material to a second composition that is entirely or mostly composed of a lower index material).

A moth-eye coating antireflection coating may have an array of nanostructures (e.g., nanostructures with subwavelength dimensions such as vertical and/or lateral dimensions of less than 300 nm, less than 250 nm, or other subwavelength size). The nanostructures may form an array of tapered nanoscale protrusions. A moth-eye coating may, for example, have an array of protrusions such as an array of pyramidal structures (e.g., an array of pyramids), an array of hemispheres (e.g., an array of hemispherical protrusions), an array of hexagonally sided protrusions, and/or other nanosized protrusions. These moth-eye nanostructures create a graded index structure that helps to reduce reflections. Nano-imprinting techniques (e.g., roller embossing), photolithography, laser processing, and/or other fabrication techniques may be used in forming moth-eye coating layers. Antireflection coatings formed from moth-eye structures may have broadband antireflection characteristics (e.g., a moth-eye coating may help reduce reflections over visible wavelengths, near infrared wavelengths, and, if desired other wavelengths). In general, any suitable techniques may be used in forming moth eye structures. For example, moth-eye antireflection coatings may be produced in situ on a lens substrate, moth-eye structures may be formed using a film with moth-eye structures that is laminated to a lens substrate, etc. If desired, moth-eye structures can be covered with other layers and/or may be formed on top of other layers (e.g., anti-smudge, anti-fog, anti-static, anti-viral, and/or anti-bacterial layers).

A thin-film interference filter antireflection coatings may be formed from a stack of organic and/or inorganic dielectric layers (and, in some configurations, other layers such as semiconductor and/or metal layers). The dielectric layers in the stack of dielectric layers may, as an example, have alternating refractive index values (e.g., layers with higher refractive index values may alternate with layers with lower refractive index values). The thicknesses of the dielectric layers, the refractive indices of the dielectric layers, and the number of dielectric layers in the antireflection coating may be configured to provide the antireflection coating and lens with a desired optical characteristics (e.g., absorption, reflection, and transmission as a function of wavelength).

As an example, it may be desirable to ensure that visible and infrared light reflectivity for lenses 52 is relatively low, as this allows the user of device 10 to view images on displays 14 without undesired visible light reflections from the surfaces of lenses 52 and helps to reduce undesired infrared light reflections from the surfaces of lenses 52 associated with the operation of infrared components such as light sources 44 and cameras 42.

Figure 3:
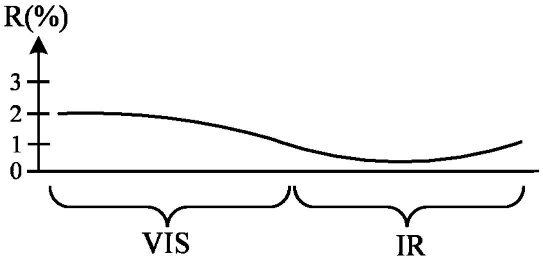
FIG. 3 is a graph in which visible and infrared reflectivity has been plotted for an illustrative lens in accordance with an embodiment.

FIG. 3 is a graph in which lens surface reflectivity R has been plotted as a function of wavelength in an illustrative arrangement in which lens 52 has antireflection coatings. In an illustrative configuration, the dielectric layers of the thin-film interference filter dielectric stack or other structures forming the antireflection coating (e.g., moth-eye structures, graded index structures formed from a layer of material with a smoothly varying composition, etc.) may be configured to reduce reflection from each lens surface to less than 3.5%, less than 3.0%, less than 2.5%, or less than 2% (as examples) across visible wavelengths VIS and infrared wavelengths IR of FIG. 3 (e.g., over a range of angles between on-axis angle of 0° and an off-axis angle of 30°, 50°, or 75°). The visible light wavelengths VIS in the graph of FIG. 3 may be visible light wavelengths of 380 to 740 nm. The infrared light wavelengths IR in the graph of FIG. 3 may be near infrared light wavelengths of 740 nm to 1200 nm, 740 nm to 1100 nm, 740 nm to 1000 nm, 740 nm to 900 nm, 850 nm to 1000 nm, or other suitable near infrared wavelength range. In an illustrative configuration, a thin-film interference filter is created that has a transmission band (band pass band) that overlaps the VIS and IR bands of FIG. 3 while exhibiting lower transmission for wavelengths shorter than the VIS wavelengths and longer than the IR wavelengths.

If desired, the reflection spectrum of the antireflection coatings on lenses 52 may be configured to impart a desired non-neutral color to lenses 52. For example, the reflection spectrum of the antireflection coating (and/or other layers of material on lenses 52) can be configured to make lenses 52 appear pinkish, bluish, purplish, or to exhibit other non-neutral color casts while ensuring sufficiently low reflectivity for lenses 52 at operating wavelengths.

In some configurations, antireflection coatings for lenses 52 may be formed from layers of inorganic dielectric such as alumina, zirconia, titania, other metal oxides, silica, silicon-nitride-based materials, etc. Dielectric layers for the antireflection coating may be deposited by physical vapor deposition processes (e.g., evaporation or sputtering). The use of sputter-deposited dielectric layers may help enhance coating durability. Diamond-like carbon (e.g., amorphous carbon layers that exhibit diamond-like properties such as elevated hardness) may be used in forming one or more antireflection coating layers or other dielectric coating layers such as hard coat layers (e.g., to provide the antireflection coating and/or other layers on lenses 52 with scratch resistance). If desired, polymer coating layers for the antireflection coating may be deposited by dipping, spraying, printing, and/or other deposition techniques. In some configurations, antireflection coatings for lenses 52 may contain one or more sol-gel layers (e.g., a sol-gel coating having inorganic nanoparticles in a polymer). If desired, a coating may be formed from a polymer that contains suspended inorganic particles. For example, metal oxide particles may be embedded in a binder of polyacrylic or other clear polymer to help enhance the refractive index of the binder.

An antistatic layer may be incorporated into an antireflection coating (e.g., as one of the layers in a stack of transparent layers of alternating refractive index that form a thin-film interference filter antireflection coating) and/or may be deposited as a layer that is separate from the antireflection coating. The antistatic layer may be formed from a transparent conductive material that dissipates electric charge such as a layer of transparent semiconductor (e.g., indium tin oxide).

Anti-smudge coatings (e.g., hydrophobic polymer coatings) may be formed on lens 52 to help reduce fingerprints and other undesired marks on the surfaces of lens 52 when lens 52 is handled. An example of an anti-smudge coating is a fluoropolymer coating (e.g., a fluoropolymer formed from evaporated perfluoropolyether) that serves as an oleophobic layer. Fluoropolymers can be adhered to underlying coating layers using an intervening adhesion layer. In an illustrative configuration, a silicon oxide layer may serve as the adhesion layer and an optional NaF catalyst layer may be used to help chemically bond the fluoropolymer to the silicon oxide layer. Depositing NaF catalyzed fluoropolymer in this way may help ensure satisfactory adhesion of the anti-smudge coating.

The coatings on lenses 52 may include antifog layers. Antifog layers may be formed form hydrophilic materials such as hydrophilic polymers (as an example). In some configurations, the coatings on lenses 52 may include layers that serve as antivirus and/or antibacterial layers. For example, layer 68 of FIG. 2 and/or other coating layers on lenses 52 may include a material with antiviral and/or antibacterial properties such as titanium dioxide. Titanium dioxide may also serve as an antifog layer.

Figure 4:
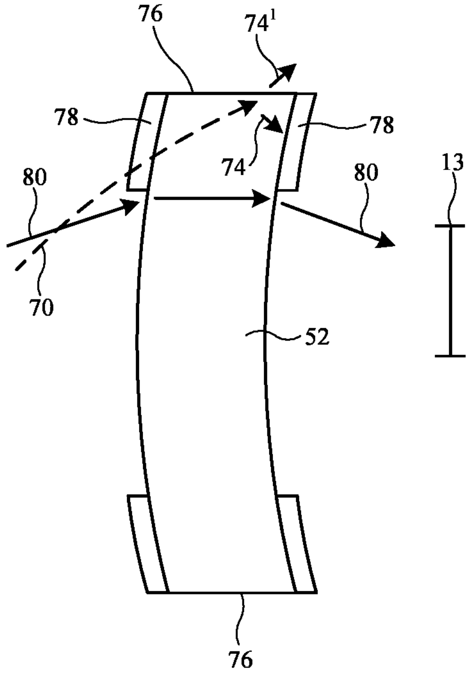
FIG. 4 is a cross-sectional view of an illustrative lens with optical surface edge masking structures in accordance with an embodiment.

Light rays that reflect from the peripheral edges of lenses 52 may degrade contrast and/or otherwise adversely affect optical performance. As shown in FIG. 4, for example, a light ray emitted by display 14 or by light source 44 such as light ray 70 may reflect from edge surface 76 of lens 52 (and may pass through edge surface 76), as shown by light rays 74 and 74'. Scattered light may be viewed in eye box 13 or may degrade image contrast when cameras 42 capture images through lens 52.

In an illustrative configuration, stray light rays produced at lens edge surfaces such as edge surface 76 can be reduced or eliminated by incorporating opaque masking structures such as masking rings 78 around the periphery of lens 52. Masking rings 78 may have central openings through which light rays 80 may pass without scattering from edge surface 76. Rings 78 may be formed from opaque polymer (e.g., part of housing 50 of FIG. 1), an opaque ink or other coating on the inner and/or outer surfaces of lenses 52, black anodized metal (e.g., part of housing 50), and/or other opaque structures. As shown in FIG. 4, rings 78 may help block rays such as light ray 70 so that edge surface 76 is not illuminated and does not result in the production of stray light rays such as rays 74 and 74'.

Figure 5:
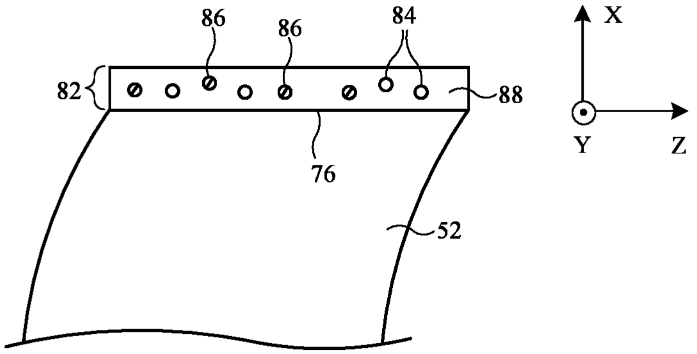
FIG. 5 is a cross-sectional side of an edge portion of an illustrative lens with a coating in accordance with an embodiment.

If desired, undesired light reflections from edge surfaces 76 of lenses 52 can be reduced by coating, roughening, and/or otherwise configuring edge surfaces 76 to scatter and/or absorb light. Consider, as an example, the illustrative arrangement of FIG. 5. In the example of FIG. 5, edge surface 76 of lens 52 has been coated with edge surface coating layer 82. Coating layer 82 may include one or more layers of material. Layer 82 may include additives such as additives 84 and 86 in binder 88. In an illustrative configuration, binder 88 is polymer. Additive 84 may be formed from particles (e.g., metal oxide particles or other inorganic dielectric particles) that have a refractive index that is different (e.g., higher) than binder 88. By adjusting the amount of additive 84 (e.g., the density of inorganic dielectric particles embedded in binder 88) the refractive index of layer 82 can be adjusted to match the refractive index of lens 52 (e.g., within +/−0.1, +/−0.05, or other suitable refractive index difference). This helps reduce reflections of light rays from the interface at lens surface 76 and therefore helps couple the light rays into layer 82 (and any additional layers on layer 82) to suppress stray light. One or more additional additives (e.g., additive 86) may be used to help absorb light that is coupled into layer 82. Additive 86 may be, for example, particles of pigment and/or dye (e.g., black particles such as carbon black particles, black dye, and/or other dye and/or pigment configured to absorb visible and/or infrared light such as light at wavelengths VIS and IR of FIG. 3). If desired, dye and/or embedded particles may be incorporated into polymer binder 88 that help match the refractive index of layer 82 to that of the substrate of lens 52 in addition to causing layer 82 to absorb desired amounts of visible and infrared light. The configuration of FIG. 5 in which polymer 88 includes separate index-matching and light-absorbing additives is illustrative.

Another illustrative configuration for reducing edge surface light reflections involves texturing edge surface 76. Etching, sandblasting, machining techniques, and/or other edge surface treatments may be used to create protrusions of varying height (see, e.g., short protrusion 90 and tall protrusion 92 on edge surface 76 of lens 52 in FIG. 6). Protrusions such as protrusions 90 and 92 may have dimensions of 0.2 microns to 2 microns, 0.3 microns to 1.5 microns, at least 0.5 microns, less than 10 microns, or other suitable dimensions. By creating a rough texture on surface 76, light rays that strike surface 76 from the interior of lens 52 will be scattered and reduced in intensity, so that these light rays are dissipated and/or absorbed by light-absorbing structures rather than being reflected towards eye box 13 or camera 42 to create interference.

Figure 6:
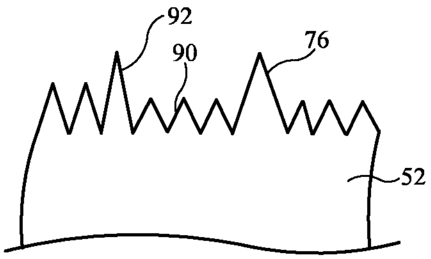
FIG. 6 is a cross-sectional view of an illustrative edge surface of a lens with a surface having a texture formed from irregular protrusions to diffusely scatter light and thereby reduce undesired light reflections in accordance with an embodiment.
Figure 7:
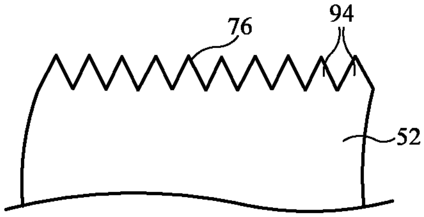
FIG. 7 is a cross-sectional view of an illustrative edge surface of a lens with a moth-eye structure that serves as an antireflection layer to help reduce lens edge surface interface reflections in accordance with an embodiment.

In the illustrative configuration of FIG. 7, edge surface 76 of lens 52 has been covered with an array of moth-eye protrusions 94 to create a moth-eye surface. Protrusions 94 may be pyramids, hemispherical protrusions, or protrusions of other tapered shapes. Due to the tapering of protrusions 94, the moth-eye layer on lens 52 exhibits a graded refractive index that smoothly decreases as a function of increasing distance from the lens 52 (e.g., from the substrate of lens 52). Protrusions 94 and/or protrusions 90 and 92 of FIG. 6 may be formed as integral portions of a lens substrate, as part of a coating on edge surface 76, and/or as part of a patterned film that is attached to edge surface 76 using heat and pressure and/or using adhesive (as examples).

Figure 8:
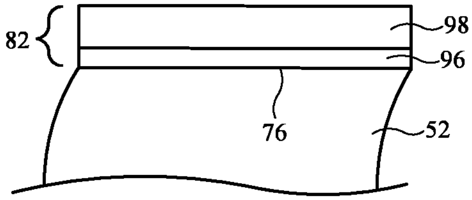
FIG. 8 is a cross-sectional side view of an illustrative edge surface of a lens with an antireflection coating overlapped by a light-absorbing layer in accordance with an embodiment.

In the example of FIG. 8, layer 82 on edge surface 76 includes a first layer such as layer 96 and a second layer such as layer 98. Layer 96 may be an antireflection layer and/or a layer that is index matched to the substrate of lens 52 to help couple light from lens 52 into layer 98 without excessive reflections at the interface between layer 96 and lens 52. Layer 98 may be a light-absorbing layer that includes light-absorbing additive(s) such as pigment and/or dye configured to absorb light at visible wavelengths VIS and/or infrared wavelengths IR (see, e.g., layer 82 of FIG. 5).

Figure 9:
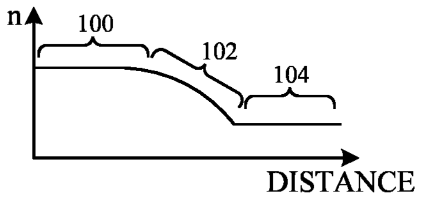
FIG. 9 is a graph showing how an antireflection coating may have an antireflection coating formed from a graded index layer in accordance with an embodiment.

If desired, layer 96 or other coating layer on lens edge surface 76 may have a graded refractive index of the type shown in FIG. 9. As shown in FIG. 9, a graded-index coating may have a higher refractive index n in portion 100 and a lower refractive index n at larger distances from lens 52 (see, e.g., portion 104). The graded-index coating may have a refractive index value that decreases smoothly between portion 100 and portion 104 (see, e.g., illustrative graded-index portion 102). Portion 100 may be located on edge surface 76 and portion 104 may face away from edge surface 76. The use of this type of graded index layer may help reduce light reflections as light from the interior of lens 52 illuminates edge surface 76, thereby helping to reduce reflections of edge surface light towards eye box 13 and towards camera 42.

A graded-index layer may include additives such as additive 86 so that the graded-index layer absorbs visible and/or infrared light (e.g., light at wavelengths VIS and/or IR), may be interposed between lens 52 and an overlapping coating (see, e.g., coating 98, which may be a light absorbing coating such as a polymer layer or other layer that includes light-absorbing additives such as additive 86), and/or may cover a surface such as textured surface 76 of FIG. 6 (as examples). Using these structures and/or other structures, light coupling from the interior of lens 52 into coating layers on the edges of lens 52 can be enhanced, thereby helping to reduce stray light reflections that could cause undesired stray light to reach eye box 13 and/or camera 42. Stray light may also be scattered and thereby diffused to help reduce the intensity of stray light reflections towards eye box 13 and/or camera 42 and/or light-absorbing coatings such as illustrative coating 82 and/or other layer(s) with light-absorbing additive can be incorporated into one or more of the structures on the edge of lens 52. Light-absorbing additive may, as an example, be incorporated into the textured protrusions of FIG. 6 and/or may be coated on top of these protrusions, may be incorporated into the moth-eye layer of FIG. 7 (e.g., in protrusions 94) and/or may be coated on top of protrusions 94, may be incorporated into layer 96 (e.g., a graded index layer) and/or into optional coating layer 98 of FIG. 8, etc.

In an illustrative configuration, the edge surface of lens 52 includes an optional light-scattering structure (e.g., an edge surface texture of the type shown in FIG. 6), an optional light-absorbing structure (e.g., a coating with light-absorbing additive), and an optional light-reflection-reducing structure (e.g., a thin-film interference filter antireflection coating, an index-matched layer, or other optical coupling layer between the lens edge surface and overlapped layer(s). The light-reflection-reducing structure may be a layer of material with a refractive index with a value that lies between that of lens 52 and that of an overlapping light-absorbing coating, a thin-film interference filter antireflection coating that helps couple light between lens 52 and the light-absorbing coating, a moth-eye layer, a graded index layer such as the layer of FIG. 8, and/or other light-reflection reducing structures. In some arrangements, light-absorbing additive may be incorporated into a light-reflection reducing layer so that light that is coupled out of the lens into the light-reflection-reducing layer is absorbed within the light-reflection-reducing layer.

If desired, lens 52 may have one or more light-blocking rings such as light-blocking rings 78 of FIG. 4 on peripheral portions of the inner and/or outer optical surfaces of lens 52 in addition to using light-reflection-reducing structures, light-scattering structures, and/or light-absorbing structures. The optical surfaces of lens 52 may have coatings such as one or more hard coat layers, antireflection coatings, anti-smudge coatings, anti-fog coatings, anti-viral coatings, anti-bacterial coatings, etc.

Figure 10:
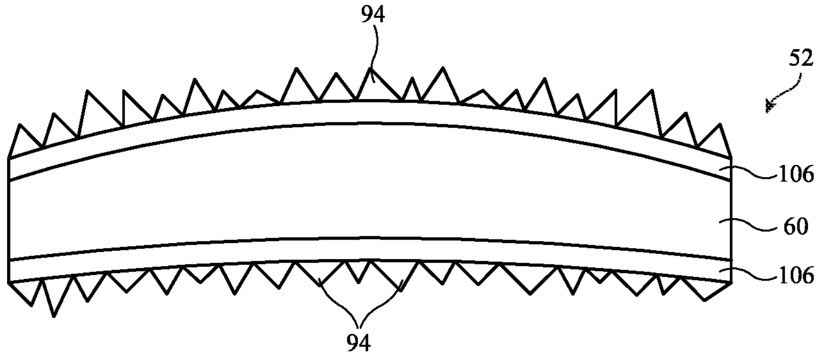
FIGS. 10, 11, and 12 are cross-sectional side views of additional illustrative lenses with moth-eye antireflection layers in accordance with embodiments.
Figure 11:
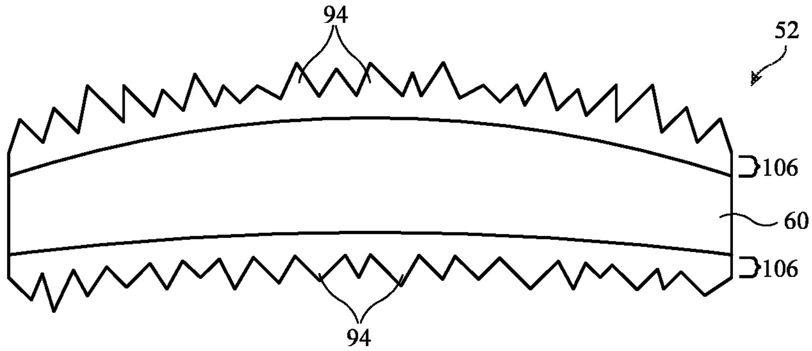
Figure 12:
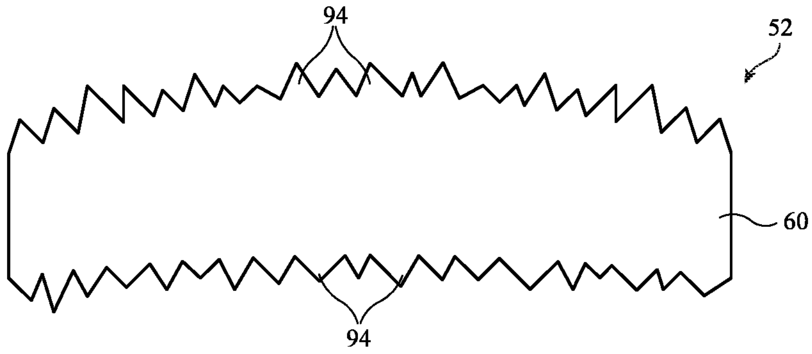

If desired, moth-eye structures may be formed on the optical surfaces of lens 52. Consider, as an example, the arrangement of FIG. 10, in which an antireflection coating formed from moth-eye protrusions 94 has been formed on hard coat 106. In this type of arrangement, the material that forms hard coat 106 may be different than the material used in forming the month-eye antireflection coating layer. The hard coat and antireflection coating layers of FIG. 10 may be formed on the inner and/or outer optical surfaces of lens substrate 60 or on other lens surfaces (e.g., the edges of lens 52). In the example of FIG. 11, the optical surfaces of lens substrate 60 of lens 52 are covered with a hard coat layer 106 and a moth-eye anti-reflection coating having protrusions 94, where the hard coat material and moth-eye protrusion material are the same. Another illustrative moth-eye antireflection coating arrangement is shown in FIG. 12. In the FIG. 12 example, moth-eye protrusions 94 are formed as integral portions of lens substrate 60 (e.g., by imprinting the surface of substrate 60 using a textured mold to produce protrusions 94). Moth-eye protrusions 94 may have sub-wavelength dimensions or other suitable dimensions (e.g., protrusions such as protrusions 94 may have vertical and/or lateral dimensions of 0.2 microns to 2 microns, 0.3 microns to 1.5 microns, at least 0.5 microns, less than 10 microns, less than 2 microns, less than 1 micron, less than 0.5 microns or other suitable dimensions. By creating a moth-eye pattern with uniformly sized protrusions or protrusions of different sizes, a graded-index effect is created that allows the moth-eye surface to form an anti-reflection layer. Moth-eye coatings of the type shown in FIGS. 10, 11, and 12 may be used on one or more optical surfaces and/or edge surfaces of lens 52 and/or may be combined with other coating layers (e.g., hard coats, anti-smudge layers, anti-static layers, anti-viral layers, anti-bacterial layers, etc., as described, for example, in connection with FIG. 2)

In accordance with an embodiment, a head-mounted device lens module is provided that includes a support structure; a display coupled to the support structure; a lens through which the display is visible from an eye box; an infrared light source configured to emit infrared light through the lens towards the eye box; and an infrared camera configured to capture an image from the eye box through the lens, the lens includes opposing first and second optical surfaces and an edge surface that extends between the first and second optical surfaces and the lens includes a light-absorbing coating on the edge surface.

In accordance with another embodiment, the lens has a lens substrate, the head-mounted device lens module includes an antireflection coating on the first and second optical surfaces that is configured so that the lens exhibits less than 2.5% reflectivity from 380 nm to 1000 nm; a hard coat between the antireflection layer and the lens substrate; and a fluoropolymer layer on the antireflection coating.

In accordance with another embodiment, the light-absorbing coating includes polymer with a light-absorbing additive configured to absorb visible light and infrared light.

In accordance with another embodiment, the light-absorbing coating has a first refractive index, the lens has a substrate with a second refractive index, and the first and second refractive indices differ by less than 0.1.

In accordance with another embodiment, the light-absorbing additive includes pigment.

In accordance with another embodiment, the light-absorbing additive includes dye.

In accordance with another embodiment, the head-mounted device lens module includes an antireflection coating on the edge surface that is overlapped by the light-absorbing coating.

In accordance with another embodiment, the antireflection coating includes a stack of thin-film dielectric layers.

In accordance with another embodiment, the antireflection coating includes a moth-eye coating.

In accordance with another embodiment, the antireflection coating includes a dielectric layer characterized by a graded refractive index.

In accordance with another embodiment, the head-mounted device lens module includes an anti-viral layer on the first and second optical surfaces.

In accordance with another embodiment, the head-mounted device lens module includes an anti-fog layer on the first and second optical surfaces In accordance with another embodiment, the head-mounted device lens module includes an anti-bacterial layer on the first and second optical surfaces.

In accordance with another embodiment, the head-mounted device lens module includes a hard coat on the first and second optical surfaces; an antireflection layer on the hard coat; and an anti-smudge layer on the antireflection layer.

In accordance with another embodiment, the antireflection layer includes a thin-film interference filter antireflection layer.

In accordance with another embodiment, the antireflection layer includes a graded index layer.

In accordance with another embodiment, the antireflection layer includes a moth-eye coating.

In accordance with another embodiment, the head-mounted device lens module includes an antistatic layer on the first and second optical surfaces.

In accordance with another embodiment, the head-mounted device lens module includes first and second opaque masking rings respectively on the first and second optical surfaces.

In accordance with another embodiment, the edge surface has protrusions of different sizes that form a light-scattering texture on the edge surface.

In accordance with another embodiment, the lens includes a lens substrate including a material selected from the group consisting of: sapphire and glass and the lens includes a sputtered hard coat on the first and second optical surfaces.

In accordance with another embodiment, the head-mounted device lens module includes a NaF catalyzed polymer anti-smudge coating on the first and second optical surfaces.

In accordance with another embodiment, the head-mounted device lens module includes a thin-film interference filter antireflection coating on the first and second optical surfaces that is configured to suppress reflections at visible and infrared wavelengths while imparting a non-neutral color to the lens.

In accordance with another embodiment, the lens includes a fixed lens and a removable vision correction lens that is removably coupled to the fixed lens and the first and second optical surfaces and the edge surface are on the removable vision correction lens.

In accordance with an embodiment, a vision-correction lens configured to removably couple to a head-mounted device in alignment with a fixed lens that overlaps a display, an infrared light source, and an infrared camera, the vision-correction lens is provided that includes

- a lens substrate having opposing first and second optical surfaces and an edge surface that extends between the first and second optical surfaces; a hard coat on the first and second optical surfaces; and an antireflection coating on the hard coat that is configured to suppress reflections of visible light from the display and infrared light from the infrared light source.

In accordance with another embodiment, the vision-correction lens includes a light-reflection-reduction structure on the edge surface.

In accordance with another embodiment, the light-reflection-reduction structure includes a coating configured to absorb the visible and infrared light.

In accordance with another embodiment, the light-reflection-reduction structure includes irregular protrusions on the edge surface that are configured to scatter light.

In accordance with another embodiment, the lens substrate has a lens substrate refractive index and the light-reflection-reduction structure has a refractive index that is within 0.1 of the lens substrate refractive index.

In accordance with another embodiment, the vision-correction lens includes first and second opaque masking rings respectively on the first and second optical surfaces.

In accordance with an embodiment, a head-mounted device is provided that includes a head-mounted support structure; left and right optical modules on the head-mounted support structure each of which has a display, a fixed lens through which the display of that module is visible from an eye box and an infrared light source that emits light through the fixed lens; and left and right removable vision correction lenses that are removably coupled to the fixed lenses of the left and right optical modules, respectively, each removable vision-correction lens includes a lens substrate with optical surfaces and an edge surface; a light-reflection-reduction coating on the edge surface; a hard coat on the optical surfaces; a thin-film interference filter antireflection coating on the hard coat; and a fluoropolymer coating on the thin-film interference filter antireflection coating.

In accordance with another embodiment, the thin-film interference filter antireflection coating of each removable vision-correction lens is configured to pass visible light from the display and infrared light from the infrared light source and is configured to impart a non-neutral color to the vision correction lens.

The foregoing is merely illustrative and various modifications can be made to the described embodiments. The foregoing embodiments may be implemented individually or in any combination.

What is claimed is:

1. A head-mounted device optical module, comprising:

- a support structure;
- a display coupled to the support structure;
- a lens through which the display is visible from an eye box;
- an infrared light source configured to emit infrared light through the lens towards the eye box;
- an infrared camera configured to capture an image from the eye box through the lens, wherein the lens comprises opposing first and second optical surfaces and an edge surface that extends between the first and second optical surfaces and wherein the lens comprises a light-absorbing coating on the edge surface; and
- an antireflection coating on the edge surface and overlapped by the light-absorbing coating.

2. The head-mounted device optical module defined in claim 1 wherein the lens has a lens substrate, the head-mounted device optical module further comprising:

- an additional antireflection coating on the first optical surface and configured so that the lens exhibits less than 2.5% reflectivity from 380 nm to 1000 nm;
- a hard coat between the additional antireflection coating and the lens substrate; and
- a fluoropolymer layer on the additional antireflection coating.

3. The head-mounted device optical module defined in claim 1 wherein the light-absorbing coating comprises polymer with a light-absorbing additive configured to absorb visible light and infrared light.

4. The head-mounted device optical module defined in claim 3 wherein the light-absorbing coating has a first refractive index, wherein the lens has a substrate with a second refractive index, and wherein the first and second refractive indices differ by less than 0.1.

5. The head-mounted device optical module defined in claim 3 wherein the light-absorbing additive comprises pigment.

6. The head-mounted device optical module defined in claim 3 wherein the light-absorbing additive comprises dye.

7. The head-mounted device optical module defined in claim 1 wherein the antireflection coating comprises a stack of thin-film dielectric layers.

8. The head-mounted device optical module defined in claim 1 wherein the antireflection coating comprises a moth-eye coating.

9. The head-mounted device optical module defined in claim 1 wherein the antireflection coating comprises a dielectric layer characterized by a graded refractive index.

10. The head-mounted device optical module defined in claim 1 further comprising an anti-viral layer on the first and second optical surfaces.

11. The head-mounted device optical module defined in claim 1 further comprising an anti-fog layer on the first and second optical surfaces.

12. The head-mounted device optical module defined in claim 1 further comprising an anti-bacterial layer on the first and second optical surfaces.

13. The head-mounted device optical module defined in claim 1 further comprising:

a hard coat on the first optical surface;

an additional antireflection layer on the hard coat; and an anti-smudge layer on the additional antireflection layer.

14. The head-mounted device optical module defined in claim 13 wherein the additional antireflection layer comprises a thin-film interference filter antireflection layer.

15. The head-mounted device optical module defined in claim 13 wherein the additional antireflection layer comprises a graded index layer.

16. The head-mounted device optical module defined in claim 13 wherein the additional antireflection layer comprises a moth-eye coating.

17. The head-mounted device optical module defined in claim 13 further comprising an antistatic layer on the first optical surface.

18. The head-mounted device optical module defined in claim 1 further comprising first and second opaque masking rings respectively on the first and second optical surfaces.

19. The head-mounted device optical module defined in claim 1 wherein the edge surface has protrusions of different sizes that form a light-scattering texture on the edge surface.

20. The head-mounted device optical module defined in claim 1 wherein the lens comprises a lens substrate comprising a material selected from the group consisting of: sapphire and glass and wherein the lens comprises a sputtered hard coat on the first and second optical surfaces.

21. The head-mounted device optical module defined in claim 1 further comprising a NaF catalyzed polymer anti-smudge coating on the first and second optical surfaces.

22. The head-mounted device optical module defined in claim 1 further comprising a thin-film interference filter antireflection coating on the first and second optical surfaces that is configured to suppress reflections at visible and infrared wavelengths while imparting a non-neutral color to the lens.

23. The head-mounted device optical module defined in claim 1 wherein the lens comprises a fixed lens and a removable vision correction lens that is removably coupled to the fixed lens and wherein the first and second optical surfaces and the edge surface are on the removable vision correction lens.

24. A head-mounted device, comprising:

a head-mounted support structure;

left and right optical modules on the head-mounted support structure each of which has a display, a fixed lens through which the display of that module is visible from an eye box, and an infrared light source that emits light through the fixed lens; and left and right removable vision-correction lenses that are removably coupled to the fixed lenses of the left and right optical modules, respectively, each removable vision-correction lens comprising:

a lens substrate with optical surfaces and an edge surface;

a light-reflection-reduction coating on the edge surface;

a hard coat on the optical surfaces;

a thin-film interference filter antireflection coating on the hard coat; and a fluoropolymer coating on the thin-film interference filter antireflection coating.

25. The head-mounted device defined in claim 24 wherein the thin-film interference filter antireflection coating of each removable vision-correction lens is configured to pass visible light from the display of a corresponding one of the left or right optical module and infrared light from the infrared light source of the corresponding one of the left or right optical module and is configured to impart a non-neutral color to that removable vision-correction lens.

26. The head-mounted device defined in claim 24, wherein the light-reflection-reduction coating comprises a coating configured to absorb visible and infrared light.

27. The head-mounted device defined in claim 24, wherein the light-reflection-reduction coating comprises an additive in a polymer binder.

28. The head-mounted device defined in claim 27, wherein the additive comprises particles having a refractive index higher than the polymer binder and configured to adjust a refractive index of the light-reflection-reduction coating to match a refractive index of the lens substrate.

29. The head-mounted device defined in claim 27, wherein the additive comprises particles configured to absorb visible and infrared light.

30. The head-mounted device defined in claim 24, wherein the light-reflection-reduction coating comprises protrusions extending away from the edge surface.

31. The head-mounted device defined in claim 24, wherein the light-reflection-reduction coating has a graded refractive index.

32. A head-mounted device optical module, comprising:

a support structure;

a display coupled to the support structure;

a lens through which the display is visible from an eye box;

an infrared light source configured to emit infrared light through the lens towards the eye box;

an infrared camera configured to capture an image from the eye box through the lens, wherein the lens comprises opposing first and second optical surfaces and an edge surface that extends between the first and second optical surfaces and wherein the lens comprises a light-absorbing coating on the edge surface; and first and second opaque masking rings respectively on the first and second optical surfaces.

* * * * *